Figure 1:
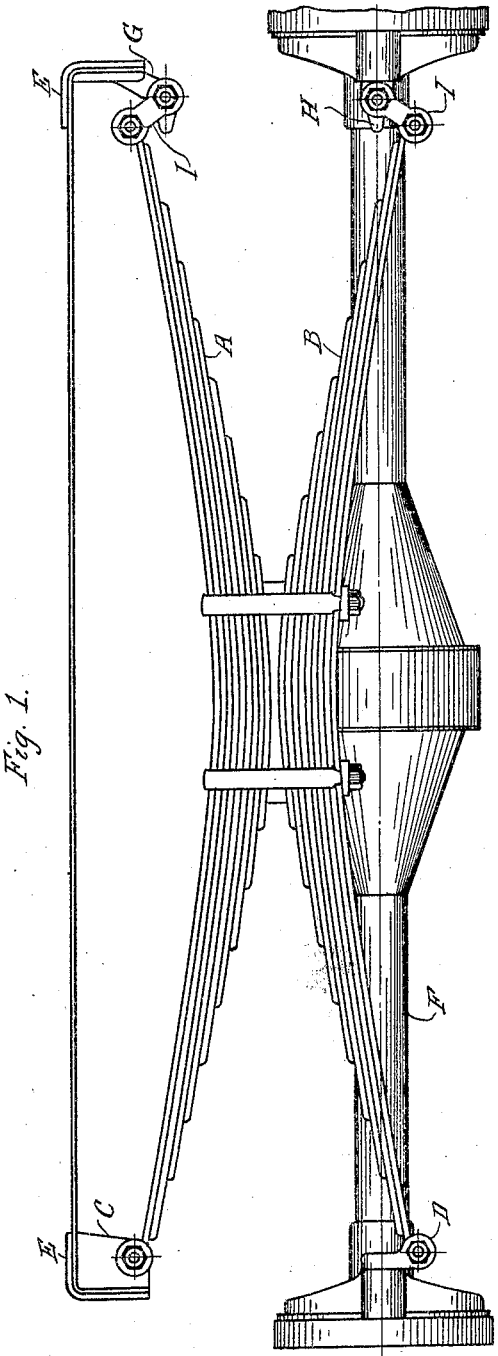

O. M. NACKER.
VEHICLE SPRING.
APPLICATION FILED JUNE 15, 1914.

1,126,832.

Patented Feb. 2, 1915.
2 SHEETS—SHEET 1.

WITNESSES:
Dan J. Lewis.
James P. Barry

INVENTOR
Owen M. Nacker.

BY
Whittemore Hulbert & Whittemore
ATTORNEY

O. M. NACKER.
VEHICLE SPRING.
APPLICATION FILED JUNE 15, 1914.
1,126,832.
Patented Feb. 2, 1915.
2 SHEETS—SHEET 2.
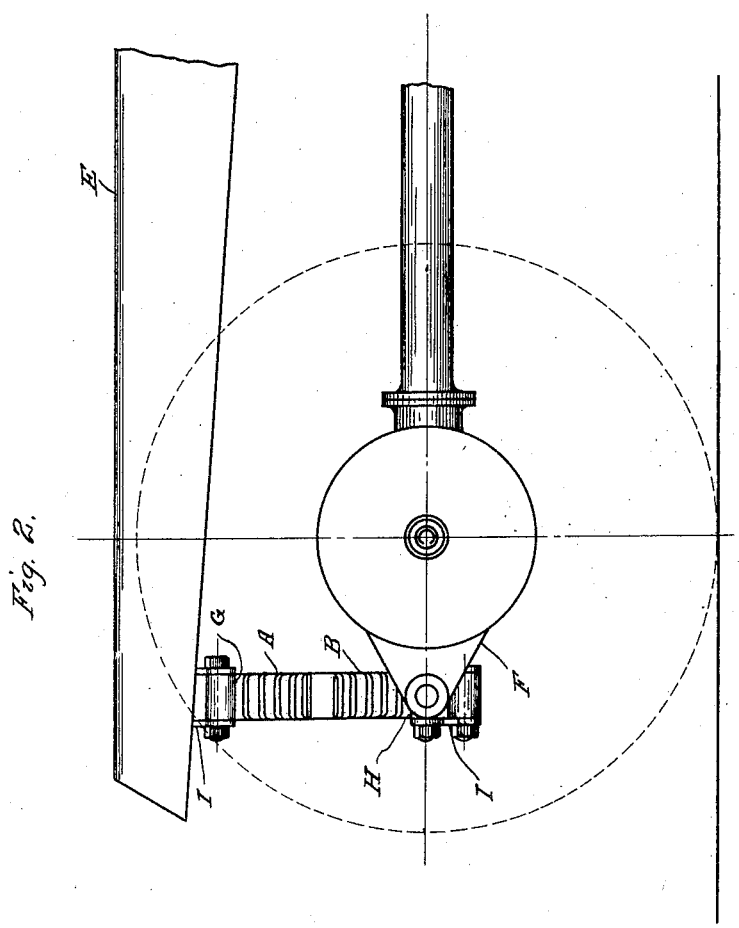
WITNESSES:
Dan J. Lewis.
James P. Barry.
INVENTOR
Owen M. Nacker.
BY
Whittemore Hulbert & Whittemore
ATTORNEY

UNITED STATES PATENT OFFICE.

OWEN M. NACKER, OF DETROIT, MICHIGAN, ASSIGNOR OF ONE-HALF TO ALANSON P. BRUSH, OF DETROIT, MICHIGAN.

VEHICLE-SPRING.

1,126,832.

Specification of Letters Patent. Patented Feb. 2, 1915.

Application filed June 15, 1914. Serial No. 845,271.

*To all whom it may concern:*

Be it known that I, OWEN M. NACKER, a citizen of the United States of America, residing at Detroit, in the county of Wayne and State of Michigan, have invented certain new and useful Improvements in Vehicle-Springs, of which the following is a specification, reference being had therein to the accompanying drawings.

The invention relates to vehicle springs more particularly designed for use in supporting the rear portion of a motor vehicle frame upon the axle, and it is one of the objects of the invention to combine vertical flexibility with lateral rigidity.

In the drawings: Figure 1 is a rear elevation of the spring as attached to a motor vehicle frame; and Fig. 2 is a side elevation.

A and B are two semi-elliptic springs, reversely arranged with their convex centers adjacent and secured to each other.

C and D are bracket members pivotally attached respectively to the springs A and B at one end thereof, and forming rigid connections respectively to the frame E and to the axle F. At the opposite ends of the springs are similar brackets G and H; but these instead of being directly pivoted to the springs are connected therewith through the medium of shackles I.

With the construction as described, when the spring is under load, the sections A and B will be deflected and the elongation produced by the flattening of the ellipses will be taken care of by the swinging of the shackles I. On the other hand, the frame E and axle F are held from relative lateral displacement, as the pivotal connections between the same and the spring sections A and B are substantially in the same vertical plane, and consequently vertical movement will not affect their lateral relation. Thus lateral oscillation of the frame is prevented without interference with the vertical flexibility.

What I claim as my invention:—

1. The combination with supporting and supported members, of a spring interposed therebetween, comprising reversely-bowed sections centrally connected to each other, pivotal connections between said sections and the respective members at one end of the spring maintained in the same fixed vertical plane, and laterally movable connections between the opposite ends of said sections and the respective members permitting elongation of the spring when under load.

2. The combination with supporting and supported members, of a spring therebetween comprising reversely-bowed sections centrally connected to each other and having their ends substantially in vertical alinement, pivotal connections between said sections at one end of said spring and the respective members permitting relative vertical movement in the same plane, but preventing relative lateral displacement, and shackle connections between the opposite ends of said sections and said members for permitting the elongation of the spring under load.

In testimony whereof I affix my signature in presence of two witnesses.

OWEN M. NACKER.

Witnesses:
JAMES P. BARRY,
HENRI E. BOWMAN.